United States Patent [19]

Gupta

[11] Patent Number: 4,526,757
[45] Date of Patent: Jul. 2, 1985

[54] PULSED FLOW VAPOR-LIQUID REACTOR

[75] Inventor: Ramesh Gupta, Berkeley Heights, N.J.

[73] Assignee: Exxon Research and Engineering Co., Florham Park, N.J.

[21] Appl. No.: 437,905

[22] Filed: Nov. 1, 1982

[51] Int. Cl.³ .......................... G05D 9/00; B01J 8/02; B01J 8/04

[52] U.S. Cl. ................................. 422/106; 137/132; 137/136; 208/303; 261/110; 261/114 R; 261/114 A; 422/191; 422/195; 422/220

[58] Field of Search ............... 422/106, 190, 191, 220, 422/195; 137/132, 136; 261/114 R, 114 A, 114 SP, 114 TC, 114 UT, 110, 97; 208/303

[56] References Cited

U.S. PATENT DOCUMENTS

| | | | |
|---|---|---|---|
| 2,501,114 | 3/1950 | Whaley | 261/114 R |
| 3,524,731 | 8/1970 | Effron et al. | 422/220 |
| 3,972,966 | 8/1976 | Lund et al. | 261/114 R |
| 4,313,908 | 2/1982 | Gupta | 422/220 X |

FOREIGN PATENT DOCUMENTS 8958 of 1910 United Kingdom ................. 261/97

OTHER PUBLICATIONS

U.S. Stoneware Co., "Support Plates and Distributors", 1957, pp. 14-15.

Primary Examiner—Barry S. Richman
Assistant Examiner—William R. Johnson
Attorney, Agent, or Firm—Donald F. Wohlers

[57] ABSTRACT

A process for automatically providing for periodic surge flow or liquid slugs in the catalyst bed to insure that the catalyst is periodically fully wetted. Therefore, before dry spots develop in the bed and some catalyst particles are deprived of the liquid reactants, the aforesaid liquid pulse or slug will rewet the catalyst. This desired periodic introduction of a liquid slug through a catalyst bed is accomplished by the provision of a plurality of automatically actuating and operating siphon means disposed and distributed across the area of the distributor tray means within the reactor.

3 Claims, 3 Drawing Figures

PULSED FLOW VAPOR-LIQUID REACTOR

BACKGROUND OF THE INVENTION

Many refining and chemical process reactors employed in the petroleum chemical industry employ the flow of a vapor and liquid mixture in a downward direction through one or more fixed beds of catalyst contained within a reactor vessel. These reactors are generally operated in the trickle flow regime meaning that the flowing gas forms a continuous phase that fills up the space between the catalyst particles while the liquid trickles down the bed of catalyst particles in the form of liquid rivulets and liquid films. In order to evenly distribute the incoming gas-liquid mixture across the catalyst bed, a flow distributor tray is used above each catalyst bed. The distributor tray divides the incoming liquid into a plurality of small streams.

One of the major problems in the design and operation of trickle bed reactors is that the catalyst particles are not fully wetted by the trickling down liquid. Dry spots exist in the catalyst bed where the catalyst is deprived of the liquid reactants. Thus, because a part of the catalyst cannot participate in the reaction, the catalyst is underutilized.

In order to overcome the problem of incomplete catalyst wetting and utilization, the trickle bed reactors are normally designed at high liquid mass velocity (high liquid flow rate per unit cross section area of the reactor). A high liquid mass velocity leads to a large number of liquid rivulets and films flowing down the catalyst bed, thereby giving a more complete catalyst wetting and utilization. A high mass velocity means that the cross section area or diameter of the reactor vessel be small. A small diameter implies that the reactor height be relatively high in order to get within the reactor the required volume of catalyst. Thus, it has been conventional in the design of reactor vessels to prefer the small diameter higher height reactor geometry to assure catalyst wetting. Alternatively, the reactor could be designed relatively big in diameter and shorter in overall height with the same volume of catalyst therein and process capacity. Such larger diameter reactor design will have a necessarily lower flow rate per unit reactor cross-section area for the same capacity but with the attendant drawback that some of the catalyst particles in the catalyst bed may remain unwetted and therefore not participate in the reaction.

The high mass velocity reactors (small diameter and higher height reactors) while having the advantage of better catalyst wetting, have the disadvantage of high pressure drop. The problem of high pressure drop becomes particularly severe if the reactor contains catalyst particles which are of small size. The problem of high pressure drop is that it is energy inefficient, but in addition is undesirous when processing petroleum feeds which are heavy or dirty in composition and therefore, more prone to plugging of the reactor beds. Accordingly, it is desirable from an energy conservation standpoint, as well as ability to process heavier and dirtier process feeds, to design reactors which are relatively larger in diameter and shorter in height than previous design practices have permitted.

SUMMARY OF THE INVENTION

The present invention overcomes the problem of high pressure drop (i.e., small diameter and large height reactors) by permitting the design of larger diameter and shorter reactors without sacrificing catalyst wetting and utilization. This is accomplished by automatically providing for periodic surge flow or liquid slugs in the catalyst bed to insure that the catalyst is periodically fully wetted. Therefore, before dry spots develop in the bed and some catalyst particles are deprived of the liquid reactants, the aforesaid liquid pulse or slug will rewet the catalyst. In accordance with applicant's invention, this desired periodic introduction of a liquid slug through a catalyst bed is accomplished by the provision of a plurality of automatically actuating and operating siphon means disposed and distributed across the area of the distributor tray means within the reactor. The invention contemplates siphons of a type which are automatically actuated upon the increase of the liquid level on the distributor tray to a predetermined height, whereupon the siphon will dump additional liquid through the tray onto the catalyst bed. Upon lowering of the liquid level on the distributor tray to a predetermined minimum below the entry orifice of the siphon means, the siphon will be lost and ceasation of the additional liquid will occur.

The aforementioned invention, providing for deliberate introduction of periodic liquid surges in the reactor is distinct from and should not be confused with the natural pulsing phenomenon that occurs in fixed bed reactors. In the natural pulsing phenomenon, the feed rate to the catalyst bed is steady but gas and liquid pulses are naturally formed within the catalyst bed. The natural pulsing is obtained only at very high flow rate and is generally not desired for pressure drop considerations.

The deliberately generated pulsed flow of the invention has some of the advantages of natural pulsing without the disadvantage of high pressure drop. For example, prior art researchers have reported that the liquid pulses improve catalyst wetting, enhance heat and mass transfer, eliminate hot spots and reduce the semi-stagnant pockets of liquid in the bed. Because there is very little interchange of mass between the stagnant liquid and the catalyst particles, elimination of the stagnant liquid improves reactor performance. Elimination of the stagnant liquid also reduces back mixing or axial dispersion of the reaction products with the reactants.

Other disclosures such as that contained in U.S. Pat. No. 3,972,966 have suggested the use of intermittent actuated siphons for transferring liquid between trays of a distillation column. However, neither of these prior teachings suggest applicant's invention wherein improved reactor design and catalyst performance is obtained by the deliberate introduction of periodic surges in the liquid flow rate through a catalyst bed whose normal pressure drop is insufficient to produce the natural surging or pulsing associated with very high flow rates and high pressure drop reactors.

Accordingly, the present invention relates to a new and novel apparatus and method of improving catalyst wetting, enhancing heat and mass transfer and preventing hot spots and semi-stagnant pockets of liquid in a fixed catalyst bed reactor where cocurrent downward flow of a vapor and liquid is distributed by a distributor tray above the catalyst bed. The invention permits the design of relatively large diameter and short height reactors of low pressure drop and mass flow velocity per unit cross-sectional area by periodically and automatically increasing the flow rate of liquid through the distributor trays by the use of automatic activation of a plurality of siphon means located on the distributor tray to thereby periodically create a pulsed flow of liquid in each catalyst bed within the reactor to assist in maintaining the catalyst therein in a wetted condition throughout the bed.

Therefore, an object of the invention is to provide siphon means on a distributor tray within the reactor which will periodically and automatically accomplish the aforesaid novel method and benefits of periodic pulsed flow.

Another object of the invention is to create a simple, trouble-free siphon design on a vapor-liquid distributor tray which is reliable in operation and economical in manufacture.

These and other objects and advantages of the invention will become apparent, and the invention will be fully understood from the following description and drawings in which FIG. 1 is a vertical cross-section through a typical fixed bed vapor-liquid phase reactor vessel;

FIG. 2 is a partial cross-section schematic view of an alternate form of automatic siphon means; and FIG. 3 is similar to FIG. 2 showing a still further embodiment of siphon distributor tray.

DETAILED DESCRIPTION OF THE INVENTION

Figure 1:
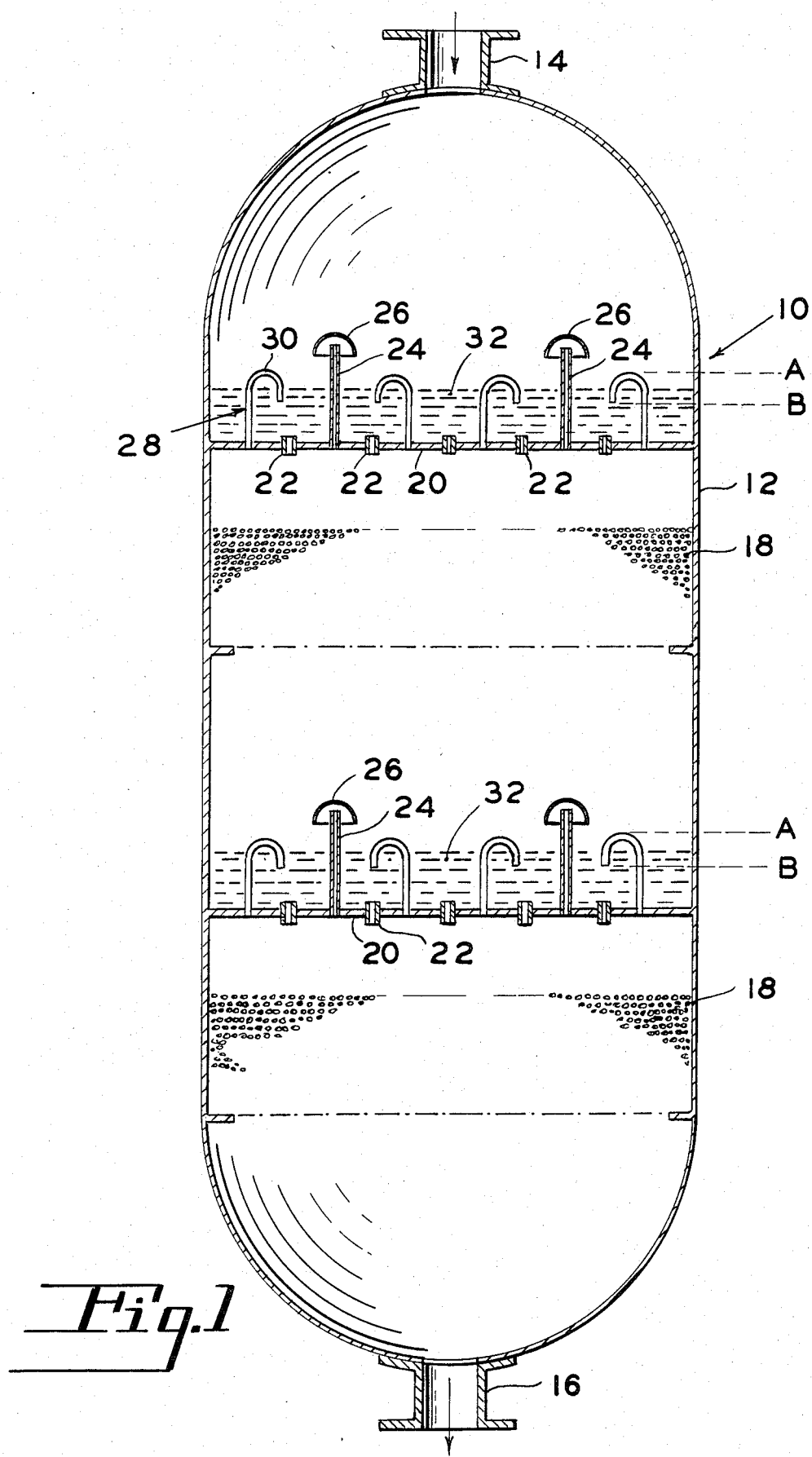

Referring to FIG. 1; a fixed catalyst bed reactor is generally shown at 10. The reactor 10 includes an outer cylindrical shell 12 having an upper inlet 14 for the introduction of the feedstream therein. Such petroleum process feedstream comprises a mixed phase of both vapor and liquid desired to be contacted with the catalyst therebelow within the reactor. The reactor 10 also includes an outlet 16 at its lower end for the discharge of the liquid and vapor reaction products of the process. Located within the reactor are one or more fixed catalyst beds indicated at 18. Associated with each catalyst bed 18 is a distributor tray means 20. Each tray means includes a plurality of liquid orifice tubes 22 disposed therethrough for the passage of liquid through the tray to descend upon the catalyst bed therebelow. The tray 20 also includes a plurality of upstanding vapor bypass tubes 24 having suitable cover means 26 above the upper ends thereof to prevent liquid from descending directly from the inlet 14 through the upper end of the tube 24. Also disposed across the area of each distributor tray are a plurality of siphon means generally indicated at 28. The lower end of the siphon means 28 extends through the tray means while the upper end terminates in a curved upper portion 30. The lower end of each curved portion 30 faces downwardly toward the level of process liquid 32 distributed across each tray. These siphon tubes 30 generate periodic liquid pulses by automatically varying the liquid head of liquid on the tray 20. When the liquid head builds up to an uppermost point indicated by level A in FIG. 1, the siphons self-actuate and a liquid pulse or surge in liquid flow rate will occur. During the operation of the siphon, liquid will be transferred to the catalyst bed 18 therebelow, not only through the orifice tubes 22, but also through the lower ends of each of the siphons 28. As the liquid level drops from level A to level B, the head of liquid on the tray will gradually decrease and the flow rate into the bed 18 will gradually decrease since the flow through conduits 22 and the siphons 28 is proportional to the liquid head on the tray 22. At the point when the upper level of the liquid 32 reaches level B in FIG. 1, vapor is sucked into the siphon tubes and the siphons are automatically lost and stop discharging any more liquid from the surface of the tray 20 onto the catalyst bed, but liquid will continue to fall in proportion to the head on the tray through the still covered orifice tubes 22. Therefore, the siphons in operation, when the liquid level on the tray is descending from the uppermost level A to level B, function to provide additional liquid distribution points across the cross-sectional area of the catalyst bed thereby creating a surge flow of liquid in the catalyst bed on a periodic and automatic basis to improve catalysts wetting and utilization and prevent the formation of semi-stagnant pockets of liquid and hot spots in fixed bed reactors whose geometry might otherwise be such as to encourage formation of such hot spots, namely in large diameter, low height reactors, having lower mass flow rates per unit crosssectional area therethrough.

Figure 2:
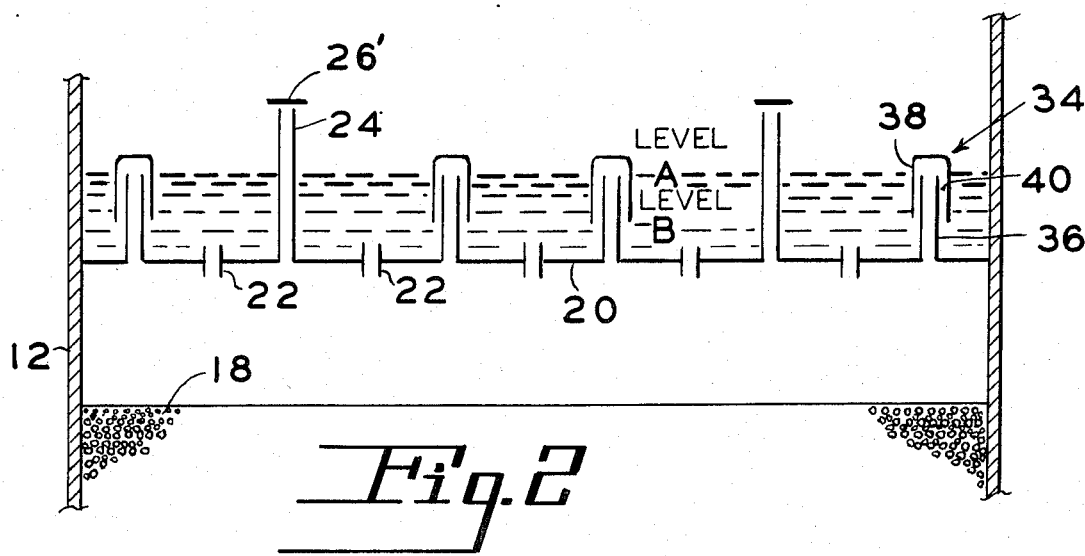
Figure 3:
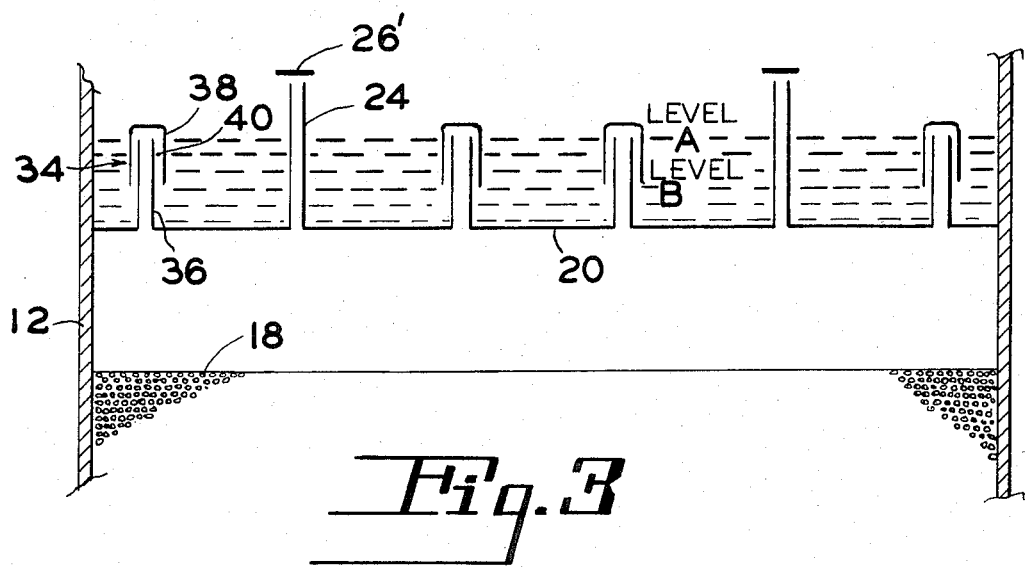

Referring to FIG. 2 an alternate form distributor tray is shown having a modified siphon configuration. In FIG. 2 and FIG. 3, the siphon means 34 are identical. Each siphon means 34 includes a straight upstanding conduit member 36 over which is located a cylindrical cap member 38 to form a u-shaped siphon therebetween. This siphon passageway is indicated at 40 and comprises an annular passageway surrounding the conduit member 36. Again, as in the operation of FIG. 1, the siphons 34 will automatically actuate upon raising of the liquid level to level A and will cease operation upon decrease of the liquid level on each of the tray means to level B.

FIG. 3, while employing an identical siphon to that shown in FIG. 2, differs therefrom in that the presence of liquid orifice tubes 22 has been dispensed with. In this embodiment, all of the liquid distributed across the catalyst bed will exit from the lower end of conduits 36, and when the siphon is lost due to lowering of the liquid to level B, no liquid will any longer be distributed across the catalyst bed from the tray. Restart of liquid distribution and flow to the bed will only occur upon raising of the level of the liquid on the tray to level A. In this embodiment even though there will be periods when no liquid will be falling from the distributor tray to the catalyst bed below, catalyst wetting and utilization will not be adversely effected because for any given flow rate the siphons will actuate (cycle) much more frequently and the time between pulses is made sufficiently short to prevent hot spots from developing in the bed.

While several specific embodiments of the invention have been shown and described in detail to illustrate the application of the inventive principles, it will be understood that the invention may be embodied otherwise without departing from such principles. For example, while applicant has illustrated siphons means as the means for creating the desired deliberate pulsed liquid flow, those skilled in the art will readily appreciate that the same desirable result may be obtained by alternate means and techniques such as intermittent pump feed to the reactor, intermittent liquid hold-up devices either in the reactor feed or upon the distributor tray and so forth.

What is claimed is:

1. The method of improving catalyst wetting and utilization in a reactor having at least one fixed catalyst bed and a relatively constant inlet liquid flow rate and a co-current downward vapor flow therethrough and wherein said reactor is designed to be relatively large in diameter and short in height in order to minimize pressure drop and mass velocity therein, comprising the steps of providing a gas and liquid distributor tray above each catalyst bed in said reactor for establishing a primary distribution pattern and flow rate of vapor and liquid through each bed, said distributor tray having a plurality of primary liquid flow openings establishing a primary liquid flow rate through said tray less than said reactor inlet liquid flow rate, and automatically and periodically increasing the flow rate of liquid through each said distributor tray and bed by the activation of a plurality of siphon means on each tray to thereby periodically distribute added liquid upon the catalyst bed therebelow whereby a pulsed flow of liquid in said bed will be established and assist in maintaining said catalyst in a wetted condition throughout said bed.

2. The method of improving catalyst wetting and utilization in a reactor having at least one fixed catalyst bed and a relatively constant inlet liquid flow rate and a co-current downward vapor flow therethrough, comprising the steps of providing a gas and liquid distributor tray above each catalyst bed in said reactor for establishing a primary distribution pattern and flow rate of vapor and liquid through each bed, said distributor tray having a plurality of primary liquid flow openings establishing a primary liquid flow rate through said tray less than said reactor inlet liquid flow rate, and automatically and periodically increasing the flow rate of liquid through each said distributor tray and bed by the activation of a plurality of siphon means on each said tray when the liquid level thereon exceeds a predetermined maximum, to thereby periodically alter the relatively constant inlet liquid flow rate to the catalyst bed therebelow into a pulsed flow of liquid to said bed to assist in maintaining said catalyst in a wetted condition throughout said bed.

3. The method of improving catalyst wetting, enhancing heat and mass transfer and preventing formation of hot-spots and semi-stagnant pockets of liquid in a fixed catalyst bed reactor having at least one catalyst bed and a vapor-liquid distributor tray associated with each bed and co-current downward vapor-liquid flow therethrough and wherein said reactor is designed to be relatively large in diameter and short in height in order to minimize pressure drop and mass velocity therein, comprising the steps of undersizing a plurality of liquid flow openings in said distributor tray relative to the normal liquid flow rate into said reactor to cause a gradual increase in the liquid level on each said distributor tray and periodically increasing the flow rate of liquid through each said distributor tray and catalyst bed by the automatic activation of a plurality of siphon means on each said distributor tray when the liquid level thereon exceeds a predetermined maximum, to thereby periodically create a pulsed flow of liquid in each said bed to assist in maintaining the catalyst in each said bed in a wetted condition throughout said bed.

* * * * *